Feb. 27, 1962   H. L. McFEATERS ETAL   3,022,990
FURNACE SYSTEM
Filed Jan. 5, 1960   4 Sheets-Sheet 1
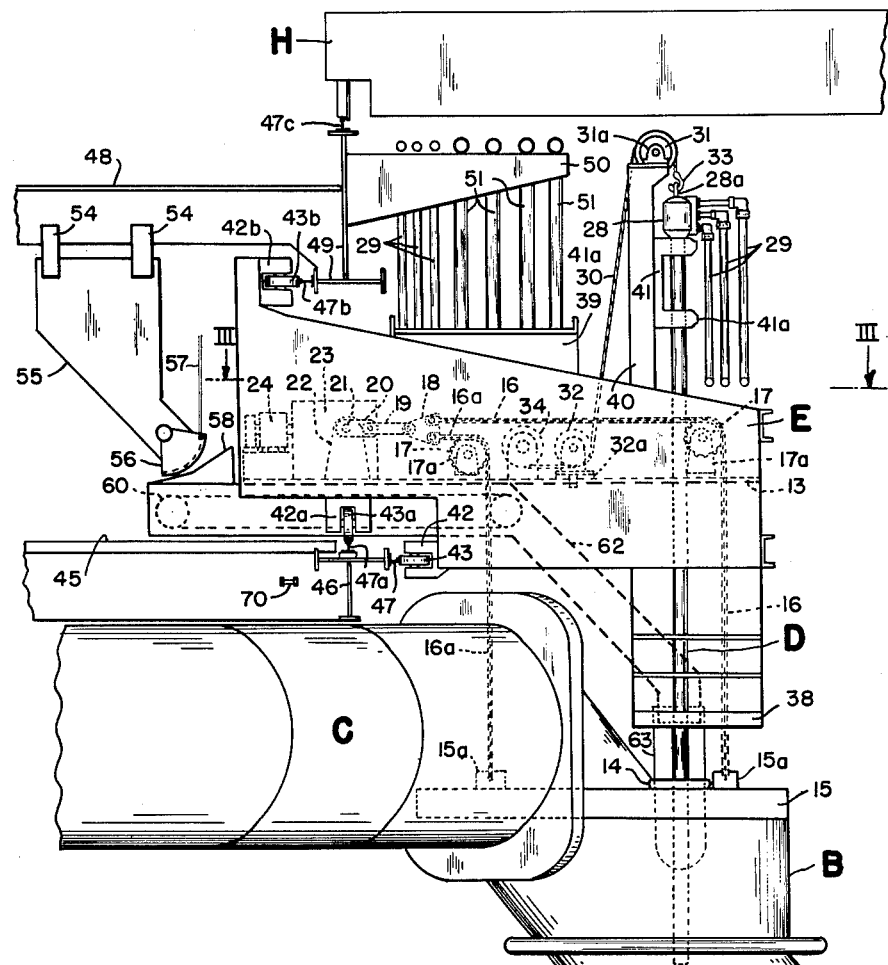
*Fig. 1*
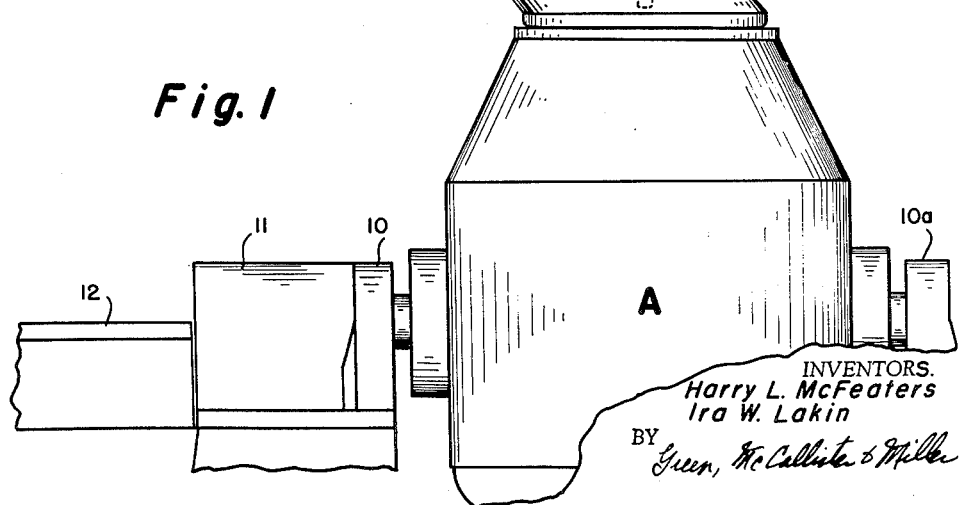
INVENTORS.
Harry L. McFeaters
Ira W. Lakin
BY
THEIR ATTORNEYS

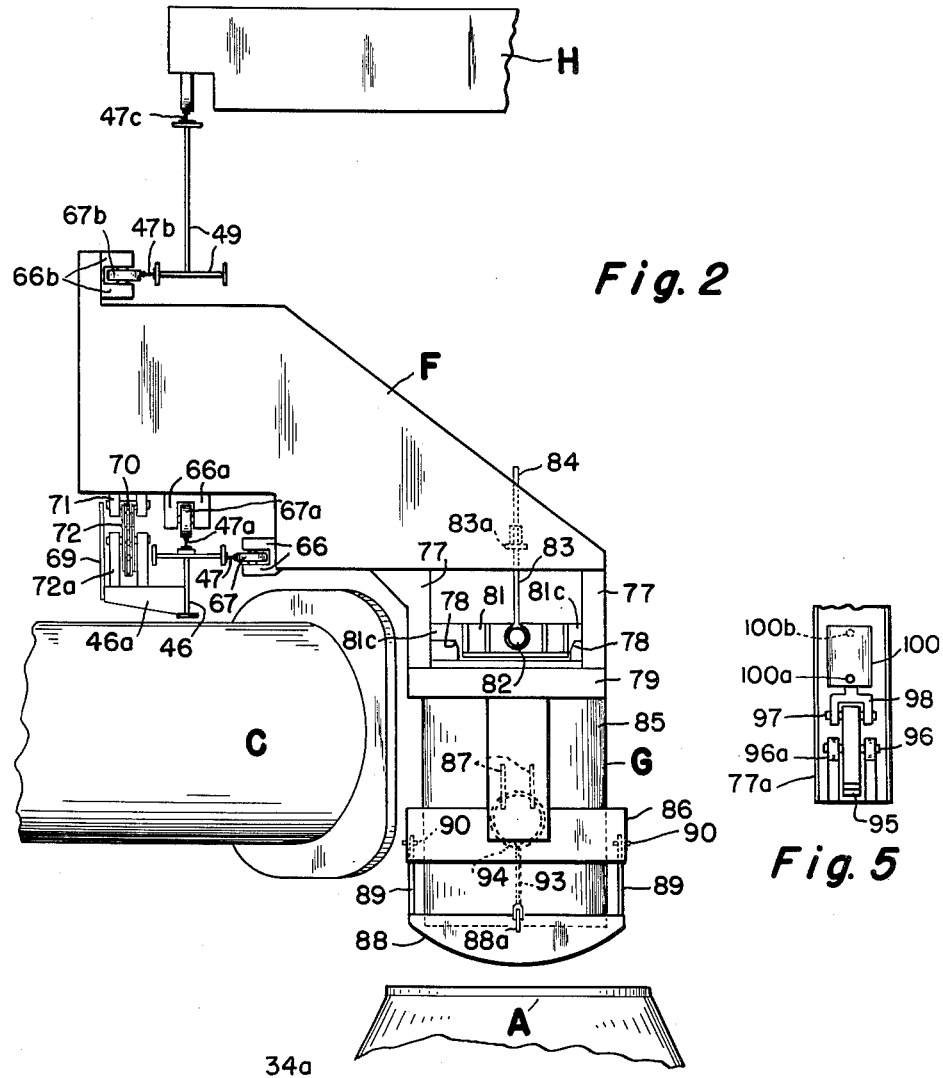
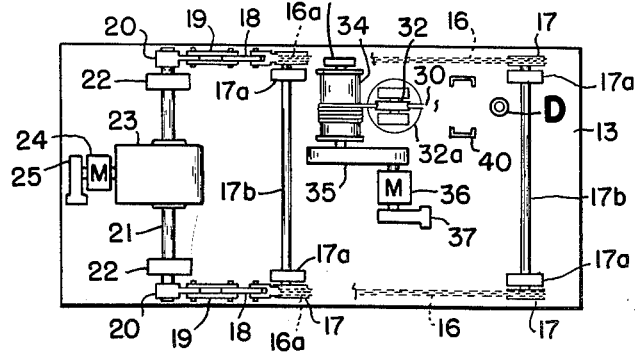

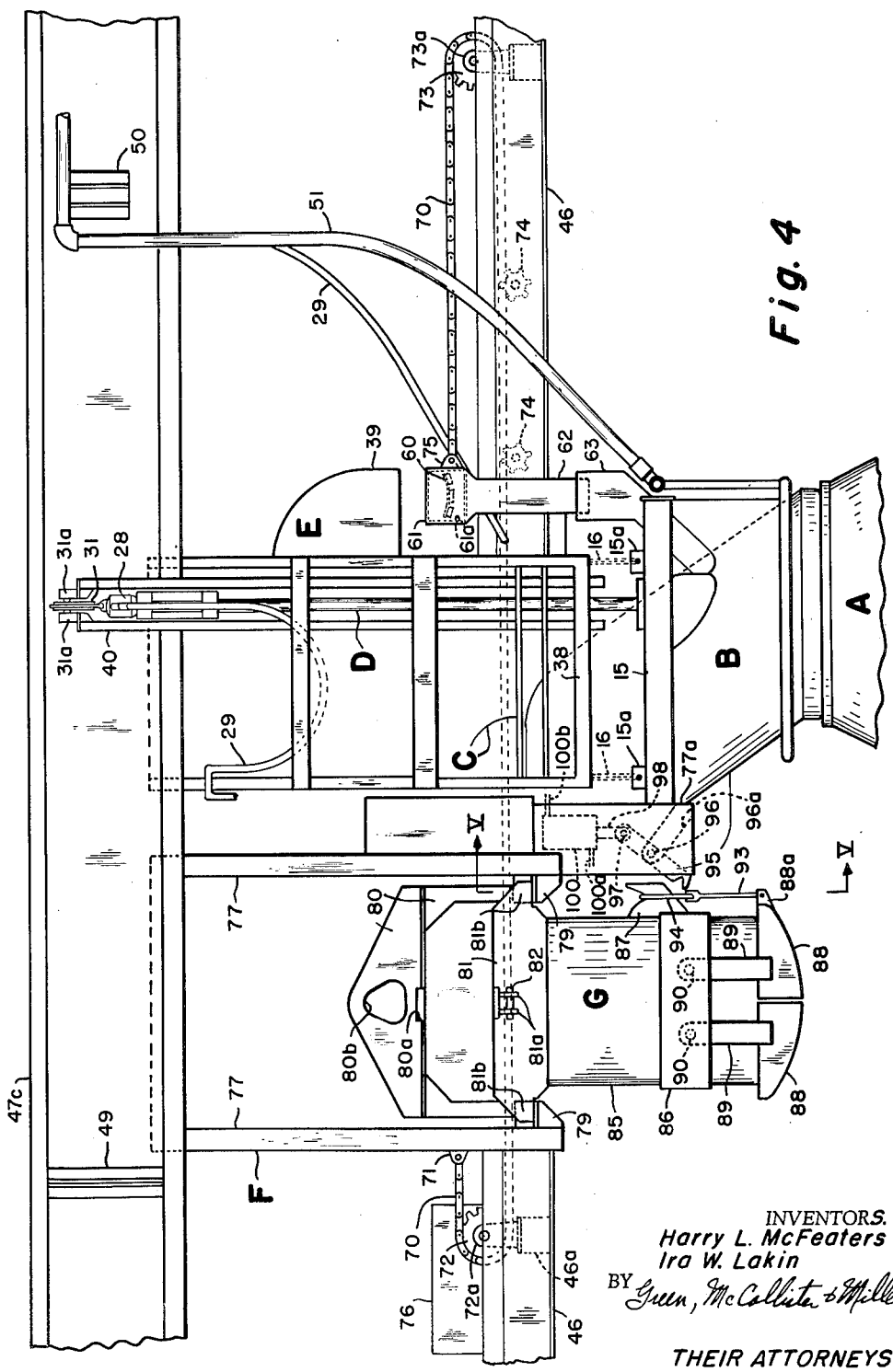

INVENTORS.
Harry L. McFeaters
Ira W. Lakin

3,022,990
FURNACE SYSTEM

Harry L. McFeaters, New Castle, and Ira W. Lakin, Volant, Pa., assignors to Pennsylvania Engineering Corporation, New Castle, Pa., a corporation of Pennsylvania
Filed Jan. 5, 1960, Ser. No. 547
11 Claims. (Cl. 266—36)

This invention pertains to a plant layout, system or installation for a furnace vessel and particularly, to an operating arrangement for efficiently charging a furnace with scrap as well as additive materials, for subjecting its contents to a blow-refining operation, and for removing and handling effluent gases and discharge from a furnace, such as a converter of an oxygen blow type.

A phase of our invention relates to an overhead operating system for servicing or controlling the utilization of a furnace vessel that has an open mouth portion at its upper end which normally faces upwardly when it is in a metal-refining position, and to a system having cantilevered servicing units that are selectively positioned-changed, and that facilitate the utilization and employment of a tiltable metal refining furnace.

In employing our invention, we utilize an overhead assembly having a longitudinal runway structure that is positioned to one side of or behind an operating plane extending centrally through a central vertical axis of the vessel for carrying at least one operating or service unit and suspending its cantilever structure to project outwardly or forwardly therefrom into the forwardly-spaced or offset operational axis or plane for the furnace. Each operating or servicing unit has means for controlling the utilization of the furnace vessel on a somewhat selective or progressive basis. The assembly is so constructed that each operating unit may be employed without interference with desired furnace operations, without interference between the units and, in such a manner, as to minimize plant operating spacing and equipment required for efficiently accomplishing a sequence of furnace operations. The layout is such that the runway and other stationary support and supply structure and apparatus are always offset, above and to one side of the furnace, so that they are protected from the heat of a metal pouring ladle and are also protected from the intense heat generated by the furnace, itself.

Our installation makes possible the construction of separate operating units for convenience of manufacture, shipping and installation which may be joined or articulated in their utilization for simplicity of operation and for selectively coordinated movement along the runway. The assembly is such that it may be mounted beneath a conventional overhead traveling crane and such that the crane may be utilized as to any desired normal operations and additionally, may be employed in a cooperative manner with respect to our assembly or layout to lift out and return a removable scrap bucket of one servicing unit in connection with charging it with scrap materials and delivering the materials into the furnace, and may be further coordinated as to its station-positioning to enable the pouring of a metal charge (as from a ladle) into the mouth portion of the furnace.

In the embodiment of our invention shown for the purpose of illustration, a set or pair of articulated units are employed and both are adapted to be moved along an overhead runway into and out of transversely-aligned stations on a longitudinal plane to one side of or behind the furnace vessel. Each service unit is shown carried in a forwardly-suspended or cantilevered relation on a pair of vertically spaced-apart vertical tracks and on a horizontal track of the runway structure.

One unit of our illustrated embodiment removably carries a scrap bucket in a suspended forwardly-cantilevered position and has means for opening its gates when scrap material is to be delivered therefrom into the open mouth portion of the furnace vessel at a furnace charging station. A second unit also has a cantilever frame which suspends or carries an effluent-receiving and discharging hood and raising and lowering mechanism for moving the hood into and out of a cooperative relation or sealing-off positioning with respect to the mouth portion of the vessel and a sealing flange of an effluent conditioning receiver. The second unit suspends or carries an oxygen lance and its attendant cluster of fluid connections, as well as means for raising and lowering the lance into and out of an operating or metal refining position within the furnace, and carries an additive system or apparatus which, at one position of the unit, is adapted to cooperate with and receive additive materials from a hopper or supply source that is independent of the servicing unit.

The forwardly projecting cantilever member of each unit, as well as the servicing equipment carried thereby, is adapted to move on a forward longitudinal plane that crosses or intersects a central vertical axis of the furnace, so that vertical alignment of such equipment may be attained with respect to the furnace. In other words, each servicing or operating unit is positioned for longitudinal movement along the runway into and out of a transversely-aligned position with respect to the furnace. The two specified cantilever service units are connected together, so that their movements may be effected simultaneously and by a common actuating or drive mechanism, and so that one unit will have an endwise or offset position with respect to the furnace vessel when the other unit is in a transversely and substantially vertically-aligned operating or servicing position with respect to the furnace vessel. It will be noted that the bucket-carrying unit has means for assuring a properly aligned carrying or suspension-positioning or mounting of its removable scrap bucket and has means for opening gate means of the bucket to discharge the scrap material in the bucket directly into the open mouth portion of the furnace.

The construction of our assembly is such that the charging of the furnace may be accomplished without interference, so that it may be tilted to pour out its slag into the slag vessel of an under-positioned slag cart or trolley and to pour out its refined metal into the teeming ladle of an under-positioned teeming ladle cart or trolley, and further so that the furnace installation can be easily serviced and repaired as to its refractory lining, etc.

Employing our layout or assembly which may be mounted in an intermediate position between the conventional overhead plant crane and the furnace vessel, it is possible to coordinate all the various operations incident to the utilization of the vessel in refining metal in a simple and effective manner, and without interference between the furnace installation and the plant structure or building. Although for the purpose of illustration, we have shown an assembly utilized in connection with one furnace vessel, it will be apparent to those skilled in the art that one assembly may be employed for servicing one or more furnace vessels by extending its longitudinal runway or track structure in such a manner that it may be positioned in a cooperating position with one vessel while another vessel is being torn down for repair and maintenance. The articulated assembly may also be moved as a unit, so that both of its cantilever units are out of alignment with the furnace vessel to, for example, facilitate charging it with molten metal from a ladle and for repair of the vessel and its operating mechanism.

It has thus been an object of our invention to provide a simplified metal refining plant layout for a tiltable metal refining furnace vessel which can be readily adapted to an existing furnace installation and which will facilitate controlled operations of the vessel;

Another object of our invention has been to develop an overhead servicing assembly for a furnace vessel whose units suspend their mechanisms or apparatus in a forwardly-offset manner, such that the stationary structure and runway for the assembly and along which it is movable will be in an offset relationship with respect to the furnace and out of the way of its mouth and will lie in a longitudinal plane behind or to the one side of a longitudinal operating axis or plane that passes across the central axis of the vessel;

A still further object of our invention has been to devise a new and improved form of operating or servicing apparatus arrangement for a furnace of an open mouth type, wherein individual units of the assembly may be manufactured and shipped as separate units but may be mounted as articulated units for a coordinated selective type of operation with respect to the furnace;

These and other objects of our invention will appear to those skilled in the art from the illustrated embodiment as set forth in the appended drawings in which FIGURE 1 is an end view in elevation showing a hood and lance carrying or servicing unit of our construction in an aligned cooperating and effluent-receiving relation with a furnace or converter vessel; in this view, a lance for blow-refining metal in the vessel is shown in its upper position wherein it clears the open mouth portion of the vessel;

FIGURE 2 is an end view in elevation showing a scrap bucket carrying or servicing unit of our construction in an aligned or ready-to-feed position with respect to the open mouth portion of the furnace;

FIGURE 3 is a horizontal view on the scale of and taken along the line III—III of FIGURE 1;

FIGURE 4 is a front side view in elevation of the units of FIGURES 1 and 2 showing them in an articulated relationship with respect to each other and as servicing units for movement along a longitudinal runway or stationary structure;

FIGURE 5 is a vertical fragmental section on the scale of and taken along the line V—V of FIGURE 4;

Figure 6:
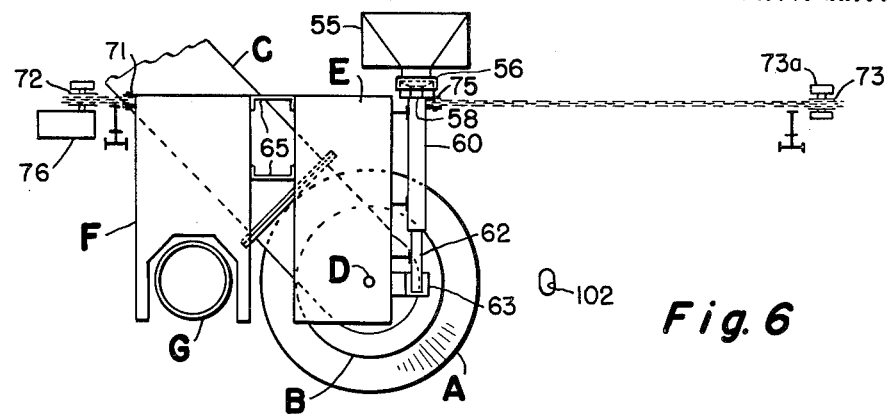
Figure 7:
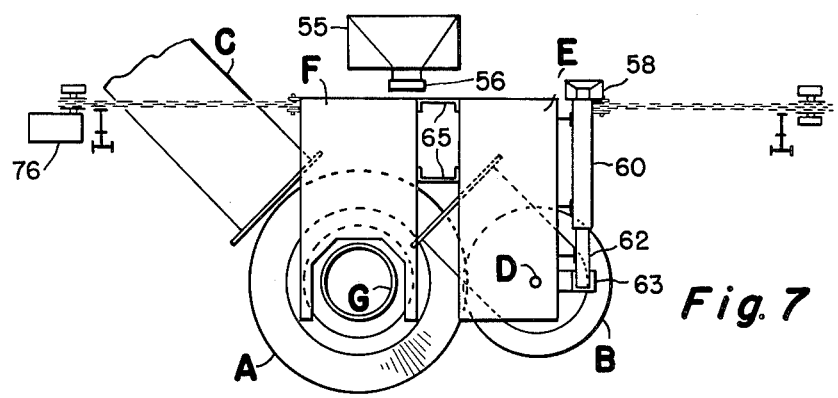
Figure 8:
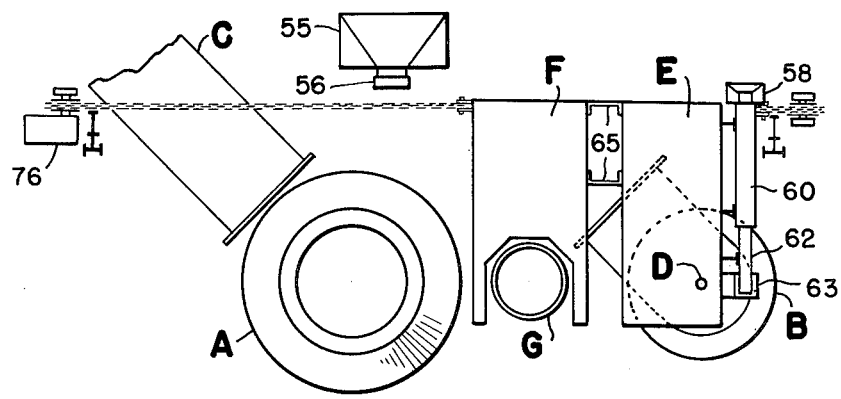

FIGURES 6 to 8, inclusive, are reduced and somewhat diagrammatic top plan views illustrating stations or positions of our system or layout; in this connection, FIGURE 6 shows the station at which the hood and lance servicing unit cooperates with the furnace, FIGURE 7 shows the station or position at which the scrap bucket servicing unit cooperates with the furnace, and FIGURE 8 illustrates a third position that may be attained in which both units of the layout clear the furnace so that it can be readily repaired, etc.

In the metal refining system or layout chosen for the purpose of illustrating our invention, A represents an oxygen-blow vessel or furnace that is conventionally rotatable or turnably mounted on its trunnions (see FIGURE 1) by bearing stands 10 and 10a. An electric motor drive unit 11 is shown operatively connected to one of the trunnions for turning it. It will be noted that the trunnions of the furnace A are in substantial alignment with a working platform or floor 12 which, as shown particularly in FIGURE 6, may have one or more by-pass openings or holes 102 therethrough to provide for dropping used lances therethrough and for picking up new lances therefrom.

A water-cooled or jacketed exhaust hood B is shown carried by one servicing or operating unit E and is adapted to be raised and lowered, for example, about 18 inches, so that its bottom inlet portion or nose may simultaneously align or seal with the lip edge of the furnace A while its upper flange or outlet portion aligns or seals with a flange of an effluent-conditioning receiver or stationary spark trap assembly C. An oxygen-blow lance D of conventional construction having cooling fluid inlet and outlet connections and an oxygen supply connection, provided as a cluster 29, is carried by the same operating unit as the hood B and is adapted to extend through an open top portion in the hood. Means is provided on the unit for raising the lance D to the position of FIGURE 1 to clear the furnace and to lower it into a metal-refining position within the furnace. It will be noted that a water-cooled lance gate 14, see FIGURE 1, which may be air-cylinder-operated to close off the opening in the hood about the lance, is employed to seal the lance passage through the hood when the lance D is in its lower or blow-refining position with respect to the furnace. The McFeaters co-pending application Serial No. 775,076 of November 19, 1958, entitled "Exhaust Hood for Oxygen Furnaces," shows a suitable type of gate for this purpose.

The operating or servicing unit E for the hood B and lance D is shown in the form of a cantilever frame member construction to support and transport the hood and lance from one station or position to another, see, for example, the stations or positions of FIGURES 6 and 7. A second operating or servicing unit F in the form of a cantilever frame member construction is provided for supporting and transporting a removable scrap bucket unit G. It will be noted that the bucket unit G is carried by the servicing unit F into and out of the aligned position of FIGURE 7 and has means for raising and lowering into and out of a suspended position with respect to the structure of unit F, such means may be engaged by the hook of a cable hoist of a conventional overhead plant crane H. As customary, the crane H will carry suitable hoist drum and cable units.

Referring particularly to FIGURES 1 to 4, the hood B has an effluent-receiving passageway therethrough for moving the effluent from the open mouth or nose portion of the furnace A into the receiver C. A centrally-disposed rim 15 extends about the hood B to reinforce it and has mounting or anchor lugs 15a to receive lower ends of suspension hoist chains or cables 16 and 16a that constitute opposed end pairs for supporting the hood in a balanced relationship. As shown particularly in FIGURE 1, the servicing or operating unit E has a horizontal platform 13 on its cantilever member for mounting or positioning mechanisms to raise and lower the hood B and the lance D. As shown particularly in FIGURE 1, the hoist chains 16 and 16a of each pair extend upwardly and pass over guide sprockets 17 that are carried on mounts 17a. It will be also noted from FIGURE 3 that the mounts 17a extend upwardly from the platform 13 and carry a sprocket idler shaft 17b.

The cables 16 and 16a on each end or side of the hood are shown secured at their upper ends to a triangular-shaped connector 18 which is, in turn, pivotally connected by a pair of links 19 to a hoist crank 20. As shown in FIGURE 3, the mounting of the hoist cables 16 and 16a of the opposed pairs is identical as to both ends of the unit E. The hoist cranks 20 are shown keyed to opposite ends of a drive shaft 21 that is carried by bearing mounts 22. A reversible electric motor 24 and a gear set 23 are connected to drive the shaft 21 backwardly and forwardly to move the cranks 20 from a horizontal to a vertical position and then return them to the former position so as to effect a raising and lowering movement of the hood B to clear the furnace vessel A and move in a cooperative manner with respect to the receiver C. The electric motor 24 is shown as having a magnetic brake 25.

The lance D, as shown particularly in FIGURES 1 and 4, has a head 28 provided with swing joint connections to the cluster of flexible fluid supply connections 29; one constitutes an oxygen supply line and the other two constitute cooling water supply inlet and outlet lines. The head 28 also has a top eyelet 28a for receiving a hoist hook 33 that is carried by a lance hoist cable 30. The cable 30 passes over a top positioned idler pulley 31, see FIGURE 1, that has a mounting 31a on the top of an upright lance guide post 40. The cable 30 extends downwardly from the pulley 31 to pass under a second idler guide pulley 32 which has a mount 32a on the platform 13 and, as shown also in FIGURE 3, projects therefrom to interleave over a winding hoist drum 34. The drum 34 is rotatably positioned on the platform 30 by mount 34a and is actuated by a gear set 35 and reversible electric motor 36 whose operation is controlled by a magnetic brake 37.

As shown in FIGURE 4, the unit E has a vertically or downwardly-projecting frame 38 on which the upright guide post 40 is mounted. As shown in FIGURE 1, the unit E carries a rack 39 at its upper end for receiving the cluster 29 of flexible hoses for the lance D and a second cluster 51 of flexible hoses for cooling fluid lines (inlet and exhaust) to the hood B and the lance gate 14. The lance guide post 40 is, as shown in FIGURE 4, of somewhat channel or open box shape along its extent to guidably receive a bifurcated slide carriage or bracket 41 for vertical movement within its open side guide trough when the lance D is being raised and lowered. Manual lance clamps 41a are shown in FIGURE 1 for securing the lance to the slide carriage 41.

The unit E is carried in a forwardly-cantilevered relationship by a series of track wheels 43, 43a, and 43b to project forwardly towards a longitudinal plane which extends centrally through the furnace vessel A and is thus spaced forwardly of the plane of operation of the longitudinal runway for the units E and F. The track wheels 43 are rotatably mounted in a horizontal plane at spaced locations backwardly of and longitudinally along the unit E by bifurcated mounting brackets 42. The track wheels 43a are mounted in a longitudinally spaced-apart relationship in a vertical plane, backwardly of and underneath the unit E by downwardly-projecting bifurcated brackets 42a. It will be noted that the wheels 43 and 43a, respectively, engage longitudinal track rails 47 and 47a that are carried by a stationary girder support assembly 46 for an upper floor 45. It will be noted that the cantilever frame of the unit E (see FIGURE 1) has a stepped under cut-out portion adjacent its back side and within which the track wheels 43 and 43a are operatively positioned.

An upper back end portion of the unit E carries a series of longitudinally spaced-apart and forwardly-projecting bifurcated mounting brackets 42b for an upper series of track wheels 43b that extend in a vertical plane to engage runway or track rail 47b. An uppermost girder assembly 49 which extends longitudinally of the stationary runway structure carries an uppermost floor structure 48 which extends transversely thereof and backwardly above the unit E. As also shown in FIGURE 1, a pipe bracket 50 projects forwardly from the girder assembly 49 and is employed as a fixed suspension means for the flexible hose clusters 29 and 51.

A bin 55 for supplying additive materials to the furnace A is shown suspended in a stationary manner from the girder assembly 49 by mounting members 54 underneath the floor 48. A swing gate 56 is pivotally mounted on the bottom or delivery end of the bin 50 for movement into and out of an open and closed relationship by means of a control cable 57 to, in its open position, feed additive materials into a hopper 58 which is carried by the servicing unit E. The hopper 58 aligns with the bin 55 when the unit E is in the position of FIGURES 1 and 6, and delivers additive materials received to a transversely-forwardly-positioned motor-driven additive conveyor 60 that is also carried by the servicing unit E.

The forward end of the conveyor 60 delivers the additive materials to a vertically-inclined delivery chute 62 through its enlarged end portion 61, see particularly FIGURE 4. It will be noted that the back side 61a of the enlarged portion 61 is open to receive materials from the forward end of the belt conveyor 60. The chute 62 is shown as extending in a telescopic relationship within a final delivery chute 63 which is of angle shape and which, at its forward end, projects in an atmospherically sealed-off relationship through an open portion in the hood B, so that when the hood is aligned with the furnace A, additive materials may be delivered to the furnace vessel A, as desired.

Although, as previously indicated, the servicing units E and F may be provided as separate units for construction, shipment and ease of plant installation, we have shown them joined or articulated in FIGURES 6 and 7 by means of cross joining brackets 65. Thus, their movements may be effected by a common mechanism in a selective manner as to the furnace A.

The scrap bucket servicing or operating unit F of FIGURES 2 and 4 is shown provided with bifurcated mounting brackets 66, 66a and 66b at spaced intervals along its longitudinal extent to carry track wheels 67, 67a and 67b which, in turn, ride on track rails 47, 47a and 47b. The bracket mounts 66, like the brackets 42 of unit E, project backwardly within an under-offset or stepped portion of the servicing unit F. The brackets 66 project on a horizontal plane backwardly of the offset portion, while the brackets 67a project in a vertical plane or downwardly from an upper end portion of the unit E. As shown in FIGURES 1 and 2, the stationary girder assemblies 46 and 49 serve as track runway structures for both of the units. As previously pointed out as to the unit F, the lower girder assembly 46 carries tracks 47 and 47a, while the upper girder assembly 49 carries the track 47b. Also, as shown in FIGURE 2, an upper flange of the assembly 49 may carry a track 47c for the wheels of the overhead crane H.

As shown in FIGURES 2 and 4, the girder structure 46 carries a backwardly-projecting arm or bracket member 46a on which a mount 72a for a chain drive sprocket 72 is positioned. The drive sprocket 72 is keyed on a drive shaft of a gear set and reversible electric motor unit 76 (see FIGURE 4) that is mounted on the structure 46. It will be noted that one end of the chain 72 is secured at 71 to the extreme left end of the unit F and that the chain passes underneath the units E and F and is guided by idler sprockets 74 (rotatably mounted on the structure 46) to pass over a right-hand chain sprocket 73 that is carried on a mount 73a. The other end of the chain 70 is fixedly secured to the right-hand end of the unit E. Thus, positive actuation of the drive sprocket 72 by the reversible electric drive unit 76 will cause the articulated service units E and F to move longitudinally along the runway provided by the stationary structure, to and from such representative positions or stations, as shown in FIGURES 6 and 7 or 8.

As shown in FIGURES 2 and 4, the unit F has upright frame members 77 defining a substantially rectangular vertical frame which has front and back, spaced-apart, inwardly-sloped, slide guides to align and center the scrap bucket G when it is lowered into position on a pair of inwardly-projecting, end-positioned, spaced shelves 79. The shelves 79 (see FIGURE 4) extend along inner reaches of the lower ends of the members 77. A bifurcated, upwardly-projecting fork 80 is secured to a top-positioned suspension or support rim 81 of the scrap bucket G and has an eyelet portion 80b for receiving a hoist crane hook, if desired.

The rim 81 has bridging portions 81b at its opposite ends to rest on the pair of support shelves 79. The rim 81 also has a pair of downwardly-outwardly-projecting brackets 81a on its opposite sides. Each pair of brackets 81a carries a cross-pin 82 to removably secure an eyelet end of a lift arm 83 (see also FIGURE 2). In this manner, a pair of lift arms 83 may be removably mounted to project upwardly from opposite sides (front and back) of the scrap bucket G. A connector flange 83a secures each rod 83 to a lift cable 84 of a suitable crane, such as the overhead crane H. As shown particularly in FIGURE 4, the fork 80 has a centrally slotted-out portion 80a on each side thereof to receive the flange connector 83a in an inset relationship with respect thereto.

The bucket G has a downwardly-projecting cylindrical body 85 provided with a reinforcing band 86 about its lower portion. A pair of swing gates 88 are each carried on lower end portions of a pair of side swing arms 89. Each pair of arms 89 projects upwardly for pivot mounting at 90 on the rim 86. A lift chain 93 is, at its lower end, secured at 88a to one of the gates 88 and, at its other or upper end, has a latch ring 94 that is normally adapted to hook over and rest upon a pair of spaced-apart side hook supports or fingers 87.

As shown particularly in FIGURES 2 and 5, the spacing between each pair of hook supports or fingers 87 is sufficient to slidably receive a hook-shaped forward end of a gate-raising finger, lever or arm 95. It will be noted that the lever or arm 95 is pivotally-centrally mounted at 96 on a mount 96a extending from the structure of the unit F. The arm is, at its upper end, pivotally connected at 97 to an operating fork 98 of a piston of a fluid-driven motor 100. It will be noted that the motor 100 has end connections 100b and 100a through which positive fluid pressure may be introduced and exhausted in a direction depending upon whether it is desired to raise or lower the lower end of the finger or arm 95. When it is raised, its end slides between the hook fingers 87 to raise the ring 90 and the chain 93 and thus open one gate 88. The downward gravity-flow of scrap thus initiated swings the one gate 88 by force of the movement of the scrap material to a fully open position and simultaneously operates the other gate 88 to swing it outwardly until the supply of scrap material has been exhausted. This type of operation is accomplished due to the balanced pivoted mounting of the gates 88, as shown in FIGURE 4; they are normally biased to swing to a closed position after the scrap material has been exhausted from the inner chamber of the body 85 of the bucket G. At this time, the motor 100 may be energized to lower the arm 95 and permit the ring 94 to again rest on the fingers 87 and retain the gates 88 in a closed position when the bucket is being lifted out of position from the unit E, moved to a charge-receiving position, filled with scrap material, and then transported (as by the overhead crane H) from the loading position back to a suspended position with respect to the servicing unit F.

In FIGURE 6, we show the servicing unit E in an aligned position with the furnace A at which it may be charged with additive materials, may be blow-refined by the lance D and its effluent gases, fumes and flame may be taken off by the hood B and delivered to a stationary receiver C. In FIGURE 7, we show the articulated assembly moved further to the right, so that the servicing unit F is in an aligned relationship with the furnace A to feed scrap material thereto from its bucket G. In FIGURE 8, we have shown the articulated assembly moved to a position to one end of or longitudinally beyond the furnace vessel A which is a further movement that may be accomplished, but which is not normally necessary employing the construction of our invention.

What we claim is.

1. In an overhead system for servicing a furnace such as a tiltable oxygen-blow furnace having an open mouth portion at its upper end through which hot fume issues during a metal refining operation, an overhead support frame having a runway thereon that extends longitudinally along one side of the furnace and beyond opposite sides of a transverse plane that is perpendicular to said runway and that extends across the open mouth portion of the furnace, said runway also extending longitudinally in a spaced relation above and behind the furnace, at least one furnace servicing unit positioned transversely on said runway for movement longitudinally therealong into and out of a transversely-aligned overhead position with respect to the open mouth portion of the furnace, a cantilever member on said unit having an end portion projecting transversely away from said runway to a position above the open mouth portion of the furnace for movement with said unit on a longitudinal plane that lies forwardly of the longitudinal plane of said runway and that passes across the open mouth portion of the furnace, means for moving said unit longitudinaly along said runway into and out of the transversely-aligned overhead position while moving said end portion of said cantilever member into a substantially vertically-aligned relation with the mouth portion of the furnace, and means suspended from said end portion of said cantilever member to cooperate with the mouth portion of and service the furnace when said end portion is in its substantially vertically-aligned position thereabove.

2. In an overhead system for servicing a furnace such as a tiltable oxygen-blow furnace having an open mouth portion at its upper end through which hot fume issues during a metal refining operation, an overhead support frame having a runway thereon that extends longitudinally along one side of the furnace and beyond opposite sides of a transverse plane that is perpendicular to said runway and that extends across the open mouth portion of the furnace, said runway also extending longitudinally in a spaced relation above and behind the furnace, at least one furnace servicing unit positioned transversely on said runway for movement longitudinally therealong into and out a transversely-aligned overhead position with respect to the open mouth portion of the furnace, a cantilever member on said unit having an end portion projecting transversely away from said runway to a position above the open mouth portion of the furnace for movement with said unit on a longitudinal plane that lies forwardly of the longitudinal plane of said runway and that passes across the open mouth portion of the furnace, means for moving said unit longitudinally along said runway into and out of the transversely-aligned overhead position while moving said end portion of said cantilever member into a substantially vertically-aligned relation with the mouth portion of the furnace, servicing means suspended from said end portion of said cantilever member to cooperate with the mouth portion of and service the furnace when said end portion is in its vertically-aligned position thereabove, and means carried by said cantilever member for operating said servicing means when said end portion is in its vertically-aligned position with respect to the furnace.

3. In an overhead system for servicing a furnace such as a tiltable oxygen-blow furnace having an open mouth portion at its upper end through which hot fume issues during a metal refining operation, an overhead support frame having a runway thereon that extends longitudinally along one side of the furnace and beyond opposite sides of a transverse plane that is perpendicular to said runway and that extends across the open mouth portion of the furnace, said runway also extending longitudinally in a spaced relation above and behind the furnace, at least one furnace servicing unit positioned transversely of said runway for movement longitudinally therealong into and out of a transversely-aligned overhead position with respect to the furnace, a cantilever member on said unit having an end portion projecting transversely away from said runway to a position above the open mouth portion of the furnace for movement with said unit on a longitudinal plane that lies forwardly of the longitudinal plane of said runway and that passes across the open mouth portion of the furnace, means for moving said unit longitudinally along said runway into and out of the transverse-aligned overhead position while moving said end portion of said cantilever into a substantially vertically-aligned position above the mouth portion of the furnace, said end portion of said cantilever member comprising a frame provided with a pair of oppositely-positioned shelves defining an opening downwardly therebetween, a scrap bucket having an opposed pair of bridging portions to rest upon said shelves and project downwardly through the opening, said scrap bucket having gate means pivotally carried at its lower end for normally retaining scrap material therein, hook-latch means operatively connected between said gate means and said bucket for normally retaining said gate means in a bottom closing-off relationship with respect to the bucket, and means carried by said servicing unit and operatively positioned to engage and raise said hook latch means to open said gate means and discharge scrap material from said bucket into the open mouth portion of the furnace when said end portion of said cantilever member is in its vertically-aligned position with the mouth portion of the furnace, and said last-mentioned means being constructed to release said hook-latch means when the scrap material has been emptied from said bucket.

4. In an overhead system for servicing a furnace such as a tiltable oxygen-blow furnace having an open mouth portion at its upper end through which hot fume issues during a metal refining operation, an overhead support frame having a runway thereon that extends longitudinally along one side of the furnace and beyond opposite sides of a transverse plane that is perpendicular to said runway and that extends across the open mouth portion of the furnace, said runway also extending longitudinally in a spaced relation above and behind the furnace, at least one furnace servicing unit positioned transversely on said runway for movement longitudinally therealong into and out of a transversely-aligned overhead position with respect to the furnace, a cantilever member on said unit having an end portion projecting transversely away from said runway to a position above the open mouth portion of the furnace for movement with said unit on a longitudinal plane that lies forwardly of the longitudinal plane of said runway and that passes across the open mouth portion of the furnace, means for moving said unit longitudinally along said runway into and out of the transversely-aligned overhead position while moving said end portion of said cantilever member into a substantially vertically-aligned relation with the mouth portion of the furnace, an effluent-receiving hood carried by said cantilever member, means on said cantilever member for moving said hood into and out of a cooperating effluent-receiving position with the open mouth portion of the furnace, said hood having an upwardly-open portion therein, an oxygen blow lance operatively carried by said cantilever member and projecting downwardly through the upwardly-open portion of said hood, and means on said cantilever member for raising and lowering said lance into and out of a blowing position within the furnace through the mouth portion thereof.

5. A servicing system as defined in claim 4 wherein, said hood has a second upwardly open portion, an additive chute is carried by said cantilever member and extends into said second open portion to discharge additive materials through said hood into the furnace when said hood is in its cooperating effluent-receiving position therewith, an additive supply means is positioned in a stationary relation behind said runway, and said chute has a transversely-backwardly extending inlet portion for additive-receiving alignment with said supply means when said servicing unit is moved along said runway into its transversely-aligned position with the furnace.

6. In a servicing system as defined in claim 4 wherein, an upright guide post is carried on said cantilever member, and a carriage supporting said lance is mounted in a vertically-slidable relation with respect to said guide post to raise and lower said lance into and out of its blowing position within the furnace.

7. In an overhead servicing system for a furnace such as a tiltable oxygen-blow furnace having an open mouth portion at its upper end through which hot fume issues during a metal refining operation, a stationary overhead support frame having a runway therealong that extends longitudinally along one side of the furnace and beyond opposite sides of a transverse plane that is perpendicular to said runway and that extends across the open mouth portion of the furnace, said runway also extending longitudinally in a spaced relation above and behind the furnace, a pair of servicing units, each having a cantilever arm projecting forwardly thereabove and transversely towards the furnace, means operatively mounting said units on said runway for longitudinal movement therealong with their cantilever arms projecting transversely-forwardly therefrom and in a retained suspended relation with respect thereto for movement into and out of transversely-aligned overhead positions with respect to the open mouth portion of the furnace, a pair of servicing devices, one of said devices being carried by the cantilever arm of one of said servicing units and the other being carried by the cantilever arm of the other of said servicing units, each of said devices being adapted to substantially vertically-align with the open mouth portion of the furnace when its associated servicing unit is moved along said runway to its transversely-aligned overhead position therewith, and means actuating the movement of said servicing units along said runway to successively move each of said devices into and out of a vertically-aligned position with the open mouth portion of the furnace.

8. In a servicing system as defined in claim 7 wherein, said actuating means is carried by said runway and is connected to one of said servicing units, and said pair of servicing units are connected together in an articulated relation for movement by said actuating means longitudinally along said runway back and forth with respect to the transverse plane that is perpendicular to said runway and extends across the open mouth portion of the furnace to successively align each of said devices transversely with the open mouth portion of the furnace.

9. A servicing system as defined in claim 7 wherein, one of said servicing devices is a furnace-charging scrap bucket, and the other of said devices includes a fume-receiving hood and an oxygen-blow lance adapted to extend through the hood into the open mouth of the furnace for refining metal therein.

10. In a servicing system as defined in claim 7 wherein, one of said cantilever members has a vertical guide and seating frame, the servicing device carried by said one cantilever member is a scrap bucket carried on said frame, said scrap bucket has means for raising and lowering it into and out of a downwardly-projecting scrap-delivery position within said frame, said scrap bucket has pivotally-mounted gate means for normally retaining scrap material therein, latch-hook means is carried by said bucket and cooperates with said gate means to normally hold said gate means in a scrap-retaining position within said bucket, and operating means is carried by said one cantilever member to engage and raise said latch-hook means to open said gate means and discharge scrap material into the open mouth of the furnace when said scrap bucket is in a vertically-aligned position with respect thereto.

11. In an overhead system for servicing a furnace such as a tiltable oxygen-blow furnace having an open mouth portion at its upper end through which hot fume issues during a metal refining operation, a stationary overhead support frame having a runway therealong that extends longitudinally along one side of the furnace and beyond opposite sides of a transverse plane that is perpendicular to said runway and that extends across the open mouth portion of the furnace, said runway also extending longitudinally in a spaced relation above and behind the furnace, a pair of furnace servicing units positioned transversely in a side-by-side connected relation on said runway for movement longitudinally therealong into and out of a transversely-aligned overhead position with respect to the open mouth portion of the furnace, a cantilever member on each of said units having an end portion projecting transversely away from said runway to a position above the furnace for movement on its respective unit on a longitudinal plane that lies forwardly of the longitudinal plane of said runway and that passes along the open mouth portion of the furnace, operating means positioned on said stationary frame and connected to one of said units for selectively moving said units along said runway into and out of the transversely-aligned overhead position while moving the end portion of an associated cantilever member into a substantially vertically-aligned relation with the open mouth portion of the furnace, a scrap charging bucket suspended from the end portion of the cantilever of one of said units for charging the furnace through its open mouth portion when its associated cantilever member is in a vertically-aligned relation therewith, a stationary fume-receiving conduit positioned in a spaced relation above and with respect to the open mouth portion of the furnace, a fume-receiving hood and an oxygen blow lance carried by the cantilever member of the other of said units, and means carried by said last-mentioned cantilever member for moving its associated hood simultaneously into a fume-receiving cooperating relation with the open mouth portion of the furnace and a fume-delivering cooperating relation with said conduit and for moving said lance into and out of the open mouth portion of the furnace when said last-mentioned cantilever member is in a vertically-aligned position with respect to the open mouth portion of the furnace.

References Cited in the file of this patent

UNITED STATES PATENTS

| | | |
|---|---|---|
| 326,181 | Weimer et al. | Sept. 15, 1885 |
| 1,866,824 | Sheridan | July 12, 1932 |
| 2,501,768 | Fones | Mar. 28, 1950 |
| 2,847,206 | McFeathers | Aug. 12, 1958 |
| 2,886,304 | Gutherie | May 12, 1959 |

OTHER REFERENCES

The Foundry, pages 74–77, October 1947.
The Iron Age, pages 72–75, August 5, 1948.
The Jour. of Metals, pages 762–763, June 1956.
The Making, Shaping and Treating of Steel, 7th edition, 1957, chart between pages 334–335.
Metal Progress, vol. 73, No. 1, pages 65–71, January 1958.